(12) United States Patent
Kim et al.

(10) Patent No.: US 8,891,472 B2
(45) Date of Patent: Nov. 18, 2014

(54) METHOD AND APPARATUS FOR REPORTING CHANNEL STATE INFORMATION IN A WIRELESS COMMUNICATION SYSTEM

(71) Applicant: Samsung Electronics Co., Ltd, Gyeonggi-do (KR)

(72) Inventors: Ki-Il Kim, Gyeonggi-do (KR); Youn-Sun Kim, Gyeonggi-do (KR); Hyo-Jin Lee, Seoul (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 134 days.

(21) Appl. No.: 13/645,082

(22) Filed: Oct. 4, 2012

(65) Prior Publication Data

US 2013/0083758 A1  Apr. 4, 2013

Related U.S. Application Data

(60) Provisional application No. 61/543,016, filed on Oct. 4, 2011.

(51) Int. Cl.
*H04W 4/00* (2009.01)
*H04B 7/06* (2006.01)
*H04L 25/00* (2006.01)
*H04L 1/00* (2006.01)

(52) U.S. Cl.
CPC .............. *H04L 25/00* (2013.01); *H04B 7/0639* (2013.01); *H04B 7/0632* (2013.01); *H04B 7/065* (2013.01); *H04L 1/0026* (2013.01)
USPC ........................................................ 370/329

(58) Field of Classification Search
CPC ...................................................... H04W 24/00
USPC ........................... 370/252, 329; 375/224, 259
See application file for complete search history.

(56) References Cited

U.S. PATENT DOCUMENTS

| | | | |
|---|---|---|---|
| 2012/0063500 A1* | 3/2012 | Wang et al. | 375/224 |
| 2012/0069917 A1* | 3/2012 | Liu et al. | 375/259 |
| 2012/0076028 A1* | 3/2012 | Ko et al. | 370/252 |
| 2012/0327785 A1* | 12/2012 | Zhang et al. | 370/241 |
| 2013/0195008 A1* | 8/2013 | Pelletier et al. | 370/328 |

OTHER PUBLICATIONS

ETSI, Technical Specification, LTE; Evolved Universal Terrestrial Radio Access (E-UTRA); Physical Layer Procedures (3GPP TS 36.213 v10.3.0 Release 10), Oct. 2011.
ETSI, Technical Specification, LTE; Evolved Universal Terrestrial Radio Access (E-UTRA); Physical Channels and Modulation (3GPP TS 36.211 v10.3.0 Release 10), Oct. 2011.

* cited by examiner

*Primary Examiner* — Albert T Chou
(74) *Attorney, Agent, or Firm* — The Farrell Law Firm, P.C.

(57) ABSTRACT

A method and apparatus are provided for reporting Channel State Information (CSI) for operation of a network, when a Precoding Matrix Indicator (PMI) and a Channel Quality Indicator (CQI) cannot be calculated. The method includes reporting a first Precoding Matrix Indicator (PMI); detecting that a Rank Indicator (RI) is changed before a second PMI is reported, the RI being changed within an RI group; calculating the second PMI and a Channel Quality Indicator (CQI) using the first PMI; and reporting the second PMI and the CQI.

18 Claims, 5 Drawing Sheets

METHOD AND APPARATUS FOR REPORTING CHANNEL STATE INFORMATION IN A WIRELESS COMMUNICATION SYSTEM

PRIORITY

This application claims priority under 35 U.S.C. §119(e) to U.S. Patent Application Ser. No. 61/543,016, which was filed in the United States Patent and Trademark Office on Oct. 4, 2011, the entire disclosure of which is hereby incorporated by reference.

BACKGROUND OF THE INVENTION

1. Field of the Invention

The present invention relates generally to an apparatus and method for reporting Channel State Information (CSI) in a wireless communication system, and more particularly, to an apparatus and method for reporting CSI for a stable operation of a network in a situation where a Precoding Matrix Indicator (PMI) and a Channel Quality Indicator (CQI) cannot be calculated.

2. Description of the Related Art

In the $3^{rd}$-Generation Partnership Project (3GPP) Radio Access Network 1 (RAN1), there are various feedback report modes for CSI a User Equipment (UE) feeds back with respect to a downlink channel state to an evolved Node B (eNB). The CSI is used for scheduling a downlink channel in the eNB.

Basically, there are two CSI reporting channels for a feedback report of the CSI; (1) a Physical Uplink Control Channel (PUCCH), and (2) a Physical Uplink Shared Channel (PUSCH). The CSI report is classified into a periodic CSI report and an aperiodic CSI report, and the periodic CSI report is done via the PUCCH and the aperiodic CSI report is done by the PUSCH.

The CSI, as is well known, includes at least one of a Rank Indicator (RI), a Precoding Matrix Indicator (PMI), and a Channel Quality Indicator (CQI). The RI indicates the number of ranks of a channel, i.e., the number of layers to be used for downlink transmission. The PMI includes information about a precoding matrix desired to be used for downlink transmission. The PMI is based on the number of layers indicated by the RI. The CQI indicates a modulation scheme and a code rate desired to be used for downlink transmission.

Further, the CSI report may be classified into a wideband report reflecting a state of a total cell bandwidth and a subband report reflecting a state of each subband.

Referring to the standard documents, i.e., 3GPP TS 36.211 v10.3.0 and 3GPP TS 36.213, v10.3.0, there are a plurality of modes for CSI reporting in the PUCCH, and among the plurality of modes, referring to PUCCH mode 2-1, when the transmission mode 9 with 8 CSI-RS is configured, the wideband/subband PMI and wideband/subband CQI are reported on a specific reporting time instance. The selected precoding matrix is selected by two PMIs, i.e., a first PMI and a second PMI.

The PMIs information and a single precoding matrix for a corresponding rank are selected according to a codebook, which is defined in Table 6.3.4.2.3-3 to 6.3.4.2.3-10 in the 3GPP TS 36.211 v10.3.0. The PMIs and the CQIs are calculated based on the last reported RI.

However, according to conventional standard techniques in association with calculation of the PMI and the CQI, the PMI and the CQI cannot be calculated in certain cases. In these cases, stable communication between a network and a UE cannot be guaranteed. More specifically, the wideband first PMI value is calculated based on the last reported periodic RI. The wideband or subband PMI is calculated based on the last reported periodic RI and the wideband first PMI. The wideband or subband CQI value is calculated based on the selected precoding matrix and the last reported periodic RI. When a reported RI is changed and the next coming report is a second PMI and CQI, there is no first PMI that is calculated based on the last reported RI. In this case, the second PMI and CQI value cannot be calculated. Therefore, a need exists for a scheme that provides stable communication between a network and a UE when the PMI and the CQI cannot be calculated.

SUMMARY OF THE INVENTION

Accordingly, the present invention is designed to address at least the problems and/or disadvantages described above and to provide at least the advantages described below.

An aspect of the present invention is to provide a method and apparatus for reporting CSI for stable operation of a network when a PMI and a CQI cannot be calculated in a wireless communication system.

In accordance with an aspect of the present invention, a method is provided for reporting CSI in an uplink in a wireless communication system. The method includes reporting a first Precoding Matrix Indicator (PMI); detecting that a Rank Indicator (RI) is changed before a second PMI is reported, the RI being changed within an RI group; calculating the second PMI and a Channel Quality Indicator (CQI) using the first PMI; and reporting the second PMI and the CQI.

In accordance with another aspect of the present invention, a method is provided for reporting CSI in an uplink in a wireless communication system. The method includes reporting a first Precoding Matrix Indicator (PMI); detecting that a Rank Indicator (RI) is changed before a second PMI is reported; calculating the second PMI and a Channel Quality Indicator (CQI) based on a previous RI, which is reported before the RI is changed; and reporting the second PMI and the CQI.

In accordance with another aspect of the present invention, a method is provided for reporting CSI in an uplink in a wireless communication system. The method includes reporting a first Precoding Matrix Indicator (PMI); detecting that a Rank Indicator (RI) is changed before a second PMI is reported; calculating the second PMI and a Channel Quality Indicator (CQI) using a first PMI which is predefined among a candidate first PMI set of a previous RI, which was reported before the RI changed; and reporting the second PMI and the CQI.

In accordance with another aspect of the present invention, a method for reporting Channel State Information (CSI) in an uplink in a wireless communication system is provided. The method includes reporting a first Precoding Matrix Indicator (PMI), detecting that a Rank Indicator (RI) is changed before a second PMI is reported, and not reporting the second PMI before the first PMI based on the changed RI is reported.

In accordance with another aspect of the present invention, a UE is provided for reporting CSI in an uplink in a wireless communication system. The UE includes a transmitter for transmitting to an evolved Node B (eNB) the CSI including at least one of a first Precoding Matrix Indicator (PMI), and second PMI and Channel Quality Indicator (CQI); and a controller for reporting to the eNB, the second PMI and CQI, which are calculated using the first PMI, if the RI is changed before the second PMI is reported, after the first PMI is reported. The RI is changed within an RI group.

In accordance with another aspect of the present invention, a UE is provided for reporting CSI in an uplink in a wireless communication system. The UE includes a transmitter for transmitting to an evolved Node B (eNB) the CSI including at least one of a first Precoding Matrix Indicator (PMI), and a second PMI and a Channel Quality Indicator (CQI); and a controller for reporting to the eNB, the second PMI and the CQI, which are calculated based on a previous Rank Indicator (RI), which is reported before an RI changes, if the RI is changed before the second PMI is reported, after the first PMI is reported.

In accordance with another aspect of the present invention, a UE is provided for reporting CSI in an uplink in a wireless communication system. The UE includes a transmitter for transmitting to an evolved Node B (eNB) the CSI including at least one of a first Precoding Matrix Indicator (PMI), and a second PMI and a Channel Quality Indicator (CQI); and a controller for reporting to the eNB, the second PMI and the CQI, which are calculated using a first PMI, which is cyclically predefined among a candidate first PMI set of a previous Rank Indicator (RI), which is reported before the RI changes, if the RI changes before the second PMI is reported, after the first PMI is reported.

In accordance with another aspect of the present invention, a UE for reporting Channel State Information (CSI) in an uplink in a wireless communication system is provided. The UE includes a transmitter for transmitting to an evolved Node B (eNB) the CSI including at least one of a first Precoding Matrix Indicator (PMI), and a second PMI and a Channel Quality Indicator (CQI) and a controller for not reporting the second PMI before the first PMI based on a changed RI is reported, if the RI is changed before the second PMI is reported, after the first PMI is reported.

BRIEF DESCRIPTION OF THE DRAWINGS

The above and other aspects, features, and advantages of certain embodiments of the present invention will be more apparent from the following detailed description when taken in conjunction with the accompanying drawings, in which.

DETAILED DESCRIPTION OF THE EXEMPLARY EMBODIMENTS

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In the embodiments of the present invention described below, a PMI includes a first PMI and a second PMI, which correspond to a dual codebook structure defined in a Long Term Evolution-Advanced (LTE-A), as proposed in the 3GPP. The first PMI indicates a precoding matrix indicator in a wideband and long-term channel condition. The second PMI indicates a precoding matrix indicator in the wideband channel and long-term channel condition according to a Precoding Type Indicator (PTI) value which a User Equipment (UE) feeds back and an instance at which feedback information is reported, or a precoding matrix indicator in a subband and short-term channel condition.

For example, in PUCCH mode 2-1, according to a PTI value fed back by the UE, if PTI the UE feeds back most recently is 0, then the second PMI indicates wideband channel information; if the most recently fed back PTI is 1, then the second PMI indicates wideband channel information or subband channel information according to an instance at which the feedback transmission is performed.

Additionally, in FIGS. 1-4, "WB W1" indicates a first PMI of a wideband, "WB W2" indicates a second PMI of a wideband, "WB CQI" indicates a wideband CQI, "RI" indicates the rank indicator, and a "PTI" has a value of "0" or "1". For example, in the transmission mode 9 with 8 CSI-RS, a PMI and a CQI are calculated in different ways.

Figure 1:
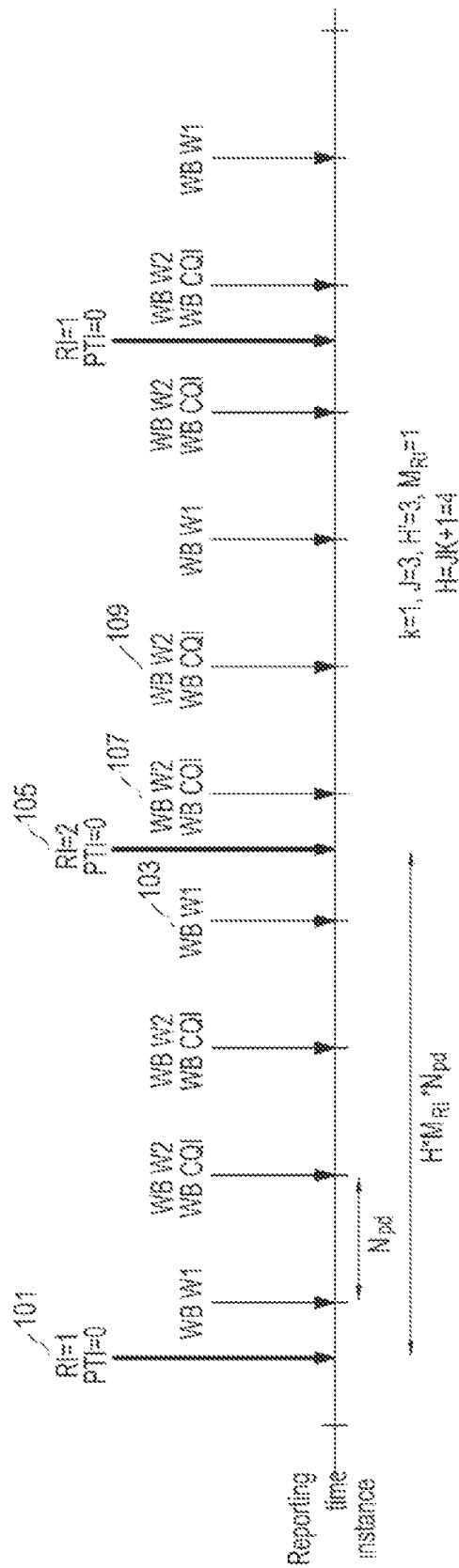
FIG. 1 illustrates an improper first PMI, when a second PMI and a CQI are calculated after an RI is changed in a wireless communication system.

FIG. 1 illustrates an improper first PMI, when a second PMI and a CQI are calculated after an RI is changed in a wireless communication system. Specifically, in FIG. 1, reference numerals 101 through 109 refer to instances at which corresponding CSIs are reported.

Referring to FIG. 1, an RI of "1" at 101 is changed to "2" at 105, and as the RI is changed at 105, a second PMI (WB W2) and a CQI (WB CQI) of a wideband are reported at 107. In this case, a first PMI and an RI last reported before reporting of the second PMI and CQI (WB W2, WB CQI) at 107 are the first PMI (WB WB1) reported at 103 and the RI reported at 105. However, the first PMI reported at 103 becomes invalid when the RI is changed at 105. Accordingly, because the first PMI reported at 103 is not valid after changing the RI at 105, it is not clear how the second PMI and the CQI at 107 and 109, respectively, are calculated based on the now invalid first PMI reported at 103.

Figure 2:
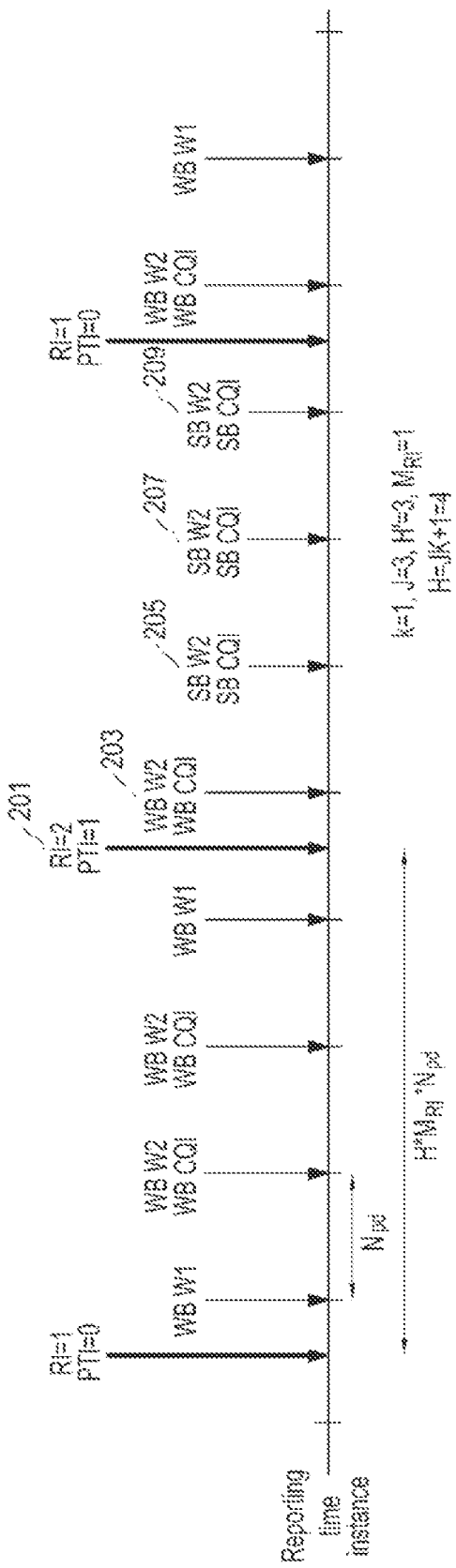
FIG. 2 illustrates an improper first PMI, when a second PMI and a CQI are calculated after an RI and a Precoding Type Indicator (PTI) are simultaneously changed in a wireless communication system.

FIG. 2 illustrates an improper first PMI, when a second PMI and a CQI are calculated after an RI and a PTI are simultaneously changed in a wireless communication system. Specifically, in FIG. 2, reference numerals 201 through 209 refer to instances at which corresponding CSIs are reported.

Referring to FIG. 2, when an RI and a PTI are changed at the same time at 201, the following second PMI and CQI have an improper first PMI, which is supposed to be calculated at 201 based on the last reported RI. Therefore, not only a wideband second PMI and a wideband CQI value at 203, but also sequential subband PMI and subband CQI values reported at 205, 207, and 209 are calculated without the proper first PMI information.

Figure 3:
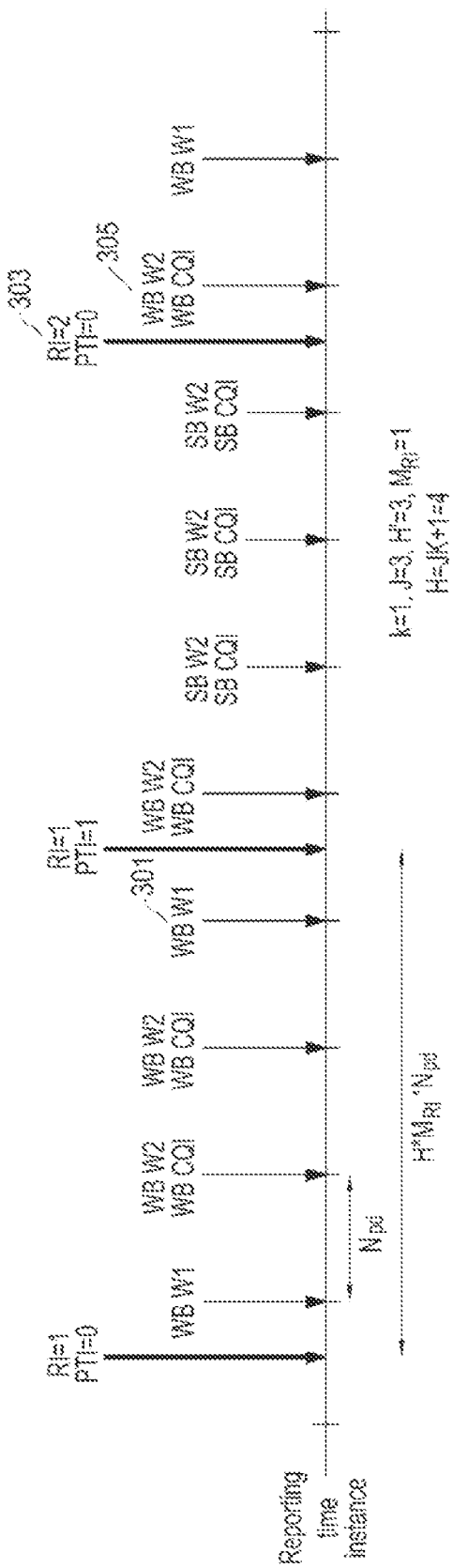
FIG. 3 illustrates an improper first PMI, when a second PMI and a CQI are calculated after an RI is changed in a wireless communication system.

FIG. 3 illustrates an improper first PMI, when a second PMI and a CQI are calculated after an RI is changed in a wireless communication system.

Referring to FIG. 3, when an RI is changed at 303, then the following wideband 25 second PMI and wideband CQI are supposed to be calculated conditioned on the last reported first PMI at 301. However, the RI assumption of the first PMI at 301 and the RI assumption of the second PMI at 305 are different. Therefore, it is also not clear how to calculate the second PMI and CQI at 305. This is similar to the case illustrated in FIG. 1.

The above-described examples where a calculation of the second PMI and the CQI become unclear are addressed in various manners by various embodiments of the present invention, as described below.

Embodiments of the present invention described below assume that in the transmission 9 with 8 CSI-RS ports, the feedback reporting includes the first and second PMI in accordance with the dual codebook structure, which was agreed in Release 10 of the 3GPP LTE standard.

The first PMI represents the wideband and long-term channel conditions. The second PMI represents the subband or short-term channel conditions. If a channel is not changed rapidly, then even though the rank changes, it does not change dramatically.

For example, when an RI starts as 1, it could change to 2. In this case, the wideband/long-term channel condition would not change that much. Therefore, it is possible that the same wideband/long-term channel condition is fedback to a network. In particular, according to a codebook structure of an 8 CSI-RS port, the first PMI of Rank 1 and Rank 2 are the same in the context of a codeword and the index of the codeword. The same condition holds in Ranks 3 and 4.

Additionally, the first PMIs of Ranks 5, 6, and 7 are the same. Therefore, when RI changes from Rank 1 to Rank 2 or vice versa, then there is a high probability to indicate the same first PMI. In this case, the first PMI may be re-used to calculate the second PMI and the CQI. The same first PMI in the changed RI can be used to calculate the second PMI and CQI when a rank is changed between Ranks 1 and 2, or between Ranks 3 and 4, or among Ranks 5, 6, and 7. For example, groups can be generated and if an RI is changed within a group, then the first PMI can be used to calculate a second PMI and a CQI. RI groups are defined as below.

Group 1: RI belongs to the set $\{1,2\}$

Group 2: RI belongs to the set $\{3,4\}$

Group 3: RI belongs to the set $\{5,6,7\}$

If a rank is changed from 2 to 3, or 5 to 4, then the first PMI indicates different wideband and long-term channel conditions. In this case, a certain pre-defined first PMI can be assumed to calculate the second PMI and the CQI, or the UE may not feedback (or may cancel) the second PMI and the CQI, as will be described below as another embodiment of the present invention.

The codebook structure of the 8 CSI-RS ports is as follow. The codebook structure of the 8 CSI-RS port may use a codebook published in the R-105011 draft disclosed in the 3GPP website, and thus will not be described in detail.

Case 1: Rank 1 and Rank 2

Codebook Expression Rank 1 and Rank 2

The codebook is expressed as shown below.

$$B = [b_0 \ b_1 \ \ldots \ b_{31}], \quad \langle \text{Codebook 1} \rangle$$

$$[B]_{1+m,1+n} = e^{j\frac{2\pi mn}{32}},$$

$$m = 0, 1, 2, 3, n = 0, 1, \ldots, 31$$

$$X^{(k)} \in \{[b_{2k\bmod 32} \ b_{(2k+1)\bmod 32} \ b_{(2k+2)\bmod 32} \ b_{(2k+3)\bmod 32}] : k = 0, 1, \ldots, 15\}$$

$$W_1^{(k)} = \begin{bmatrix} X^{(k)} & 0 \\ 0 & X^{(k)} \end{bmatrix}$$

$$C_1 = \{W_1^{(0)}, W_1^{(1)}, W_1^{(2)}, \ldots, W_1^{(15)}\}$$

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad \langle \text{Rank 1} \rangle$$

$$Y \in \{\tilde{e}_1, \tilde{e}_2, \tilde{e}_3, \tilde{e}_4\}$$

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad \langle \text{Rank 2} \rangle$$

$$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

In Ranks 1 and 2, $\tilde{e}_n$ is a 4×1 selection vector with all zeros except for the n-th element with a value of 1.

Case 2: Rank 3 and Rank 4

Codebook Expression: Rank 3 and Rank 4

$$B = [b_0 \ b_1 \ \ldots \ b_{15}], \quad \langle \text{Codebook 1} \rangle$$

$$[B]_{1+m,1+n} = e^{j\frac{2\pi mn}{16}},$$

$$m = 0, 1, 2, 3,$$

$$n = 0, 1, \ldots 15$$

$$X^{(k)} \in \{[b_{4k\bmod 16} \ b_{(4k+1)\bmod 16} \ \ldots \ b_{(4k+7)\bmod 16}] : k = 0, 1, 2, 3\}$$

$$W_1^{(k)} = \begin{bmatrix} X^{(k)} & 0 \\ 0 & X^{(k)} \end{bmatrix}$$

$$C_1 = \{W_1^{(0)}, W_1^{(1)}, W_1^{(2)}, W_1^{(3)}\}$$

$$W_2 \in C_2 = \left\{ \frac{1}{\sqrt{2}} \begin{bmatrix} Y_1 & Y_2 \\ Y_1 & -Y_2 \end{bmatrix} \right\} \quad \langle \text{Rank 3} \rangle$$

$$(Y_1, Y_2) \in \left\{ \begin{array}{l} (e_1, [e_1 \ e_5]), (e_2[e_2 \ e_6]), \\ (e_3, [e_3 \ e_7]), (e_4, [e_4 \ e_8]), \\ (e_5, [e_1 \ e_5]), (e_6, [e_2 \ e_6]), \\ (e_7, [e_3 \ e_7]), (e_8, [e_4 \ e_8]), \\ ([e_1 \ e_5]e_5), ([e_2 \ e_6], e_6), \\ ([e_3 \ e_7], e_7), ([e_4 \ e_8], e_8), \\ ([e_5 \ e_1], e_1), ([e_6 \ e_2], e_2), \\ ([e_7 \ e_3], e_3)([e_8 \ e_4], e_4) \end{array} \right\}$$

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad \langle \text{Rank 4} \rangle$$

$$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

In Ranks 3 and 4, $\tilde{e}_n$ is an 8×1 selection vector with all zeros except for the n-th element with a value of 1.

Case 1: Rank 5 to Rank 7
Codebook Expression Rank 5 to Rank 8

$$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix}, \quad \langle \text{Rank 5} \rangle$$

$$X^{(1)} = \text{diag}\{1, e^{j\pi/4}, j, e^{j3\pi/4}\}X^{(0)},$$
$$X^{(2)} = \text{diag}\{1, e^{j\pi/8}, e^{j2\pi/8}, e^{j3\pi/8}\}X^{(0)},$$
$$X^{(3)} = \text{diag}\{1, e^{j3\pi/8}, e^{j6\pi/8}, e^{j9\pi/8}\}X^{(0)}$$

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 \\ \tilde{e}_1 & -\tilde{e}_1 & \tilde{e}_2 & -\tilde{e}_2 & \tilde{e}_3 \end{bmatrix}$$

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\}, \quad \langle \text{Rank 6} \rangle$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 \\ \tilde{e}_1 & -\tilde{e}_1 & \tilde{e}_2 & -\tilde{e}_2 & \tilde{e}_3 & -\tilde{e}_3 \end{bmatrix}$$

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\}, \quad \langle \text{Rank 7} \rangle$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 \end{bmatrix}$$

$$W_1 \in C_1 = \left\{ \begin{bmatrix} X^{(0)} & 0 \\ 0 & X^{(0)} \end{bmatrix} \right\}, \quad \langle \text{Rank 8} \rangle$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 & -\tilde{e}_4 \end{bmatrix}$$

In Rank 5 to Rank 8, $\tilde{e}_n$ is a 4×1 selection vector with all zeros except for the n-th element with a value of 1.

In each case, the first PMI indicates the same matrix (W1), which represents wideband and long-term channel conditions, respectively.

To prevent a situation where the calculation of the second PMI and the CQI becomes unclear, as described above, an H' value, which is a periodicity factor, may be restricted. The random value can cause the time misalignment between an RI reporting period and a second PMI and a CQI reporting period.

Currently, reporting instances for an RI are subframes satisfying Equation (1).

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad (1)$$

In Equation (1), the integer H is defined as H=J·K+1, and is related to a period in feedback transmission of the wideband second PMI. The feedback period of the wideband second PMI occurs in a period of H·N$_{pd}$ subframes. J indicates the number of bandwidth parts, and the parameter K is configured by higher-layer signaling. H includes a period for calculating a time taken in feeding back the wideband second PMI/CQI one time and repeating K times a process of feeding back the subband second PMI/CQI for each bandwidth part. $n_f$ is system frame number and $n_s$ is slot number within a radio frame. The periodicity N$_{pd}$ (in subframes) and offset N$_{OFFSET,CQI}$ (in subframes) for CQI/PMI reporting are determined based on the parameter cqi-pmi-ConfigIndex (I$_{CQI/PMI}$) given in Table 7.2.2-1A in the 3GPP TS 36.213, v10.3.0. The value N$_{OFFSET,RI}$ is the relative reporting offset for an RI. M$_{RI}$ is a value related to a period of RI feedback transmission, and the RI is fed back in a period of H·N$_{pd}$M$_{RI}$ subframes. That is, a period of feeding back the wideband second PMI/CQI M$_{RI}$ times is equal to a period of feeding back the RI.

When the most recently transmitted PTI is 0, the wideband first precoding matrix indicator report has period H'·N$_{pd}$, and is reported on the subframes satisfying Equation (2).

$$(10 \times n_f + \lfloor n_s/2 \rfloor - N_{OFFSET,CQI}) \bmod (H' \cdot N_{pd}) = 0 \quad (2)$$

In Equation (2), H' is signaled by higher layers. H' indicates the periodicity factor, and is a value related to a period of the wideband first PMI, in which the period is H'·N$_{pd}$.

If the value H' is conditioned as H'=mH, 1≤m≤M$_{RI}$, then even though the RI is changed, the very next reporting time instance becomes first PMI information. Therefore, when the PTI is not changed, there is no case where the second PMI and the CQI do not have the proper first PMI information.

The UE does not feedback the second PMI and the CQI information when the last reported RI is different from the RI condition, which the last reported first PMI is calculated based on. More specifically, the erroneous feedback information of a second PMI and a CQI can cause the degradation of system performance. The network (e.g., an eNB, a Femto Node, etc.) can schedule the UE based on the second PMI and the CQI, which are calculated in the RI condition where the unclear first PMI information is generated. Accordingly, in this case, there is a high Negative ACKnowledgement (NACK) probability due to inadequate link adaptation. Thus, according to the current embodiment, the method for reporting CSI in an uplink in a wireless communication system may include not reporting the second PMI before reporting the first PMI based on the changed RI, if the RI is changed before the second PMI is reported, after the first PMI is reported. The UEs not sending feedback information help the system performance as in the current embodiment.

The benefit of this embodiment is two-folded.

This reduces the network interference level as the second PMI and CQI without the associated first PMI cannot be used by the network.

In the case of carrier aggregation, cancelling the second PMI and CQI report on one Component Carrier (CC) can make room for a PUCCH transmission on the other CCs.

A UE is prohibited from changing RI information under the above unclear reporting time condition. Consequently, as soon as an RI is reported, the next coming report is a second PMI and a CQI case. Although this method restricts UE behavior, all reporting information is valid for network to support UE.

When the first PMI is not calculated based on the last reported RI, then the second PMI is calculated based on the first PMI and a corresponding previous RI value, not based on the last reported RI.

Figure 4:
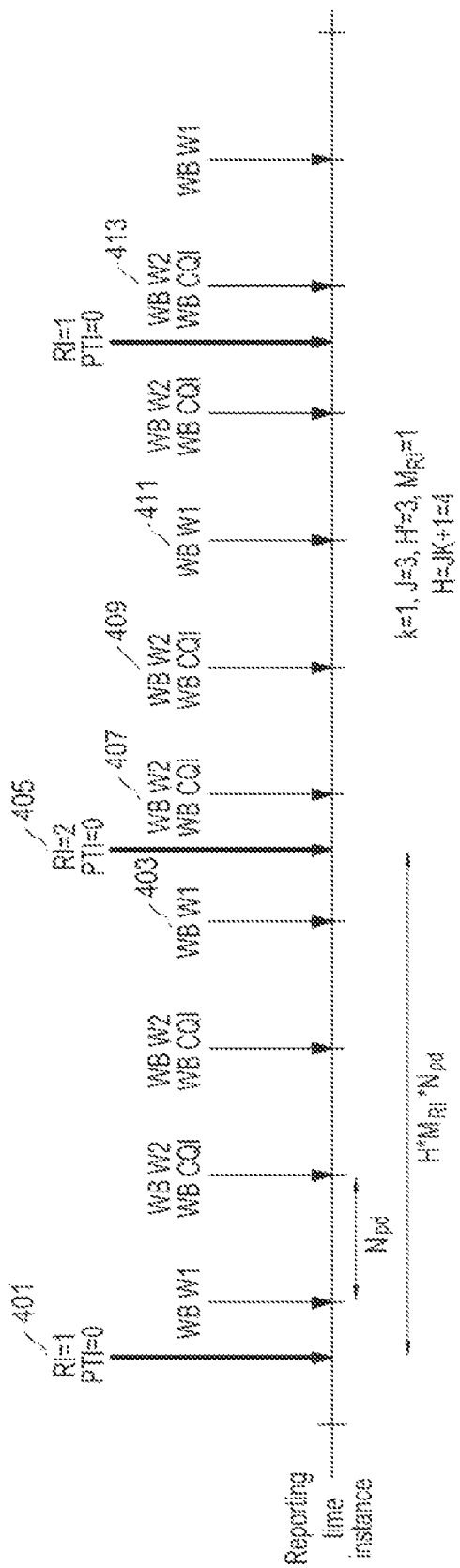
FIG. 4 illustrates a method for calculating a second PMI based on a previous RI condition according to an embodiment of the present invention.

FIG. 4 illustrates a method for calculating a second PMI based on a previous RI condition according to an embodiment of the present invention.

Referring to FIG. 4, when an RI is changed at 405, and the next reporting instance is the second PMI and the CQI reporting instance. In this case, in accordance with an embodiment of the present invention, the second PMI is calculated based on the first PMI at 403 and a corresponding RI value at 401, not based on the last reported RI at 405, until the new first PMI reporting time instance at 409. Therefore, the second PMI and the CQI at 409 are also calculated based on the first PMI at 403 and the corresponding previous RI preceding the change of the RI at 401. After the new first PMI is fedback at 411, the following second PMI and CQI is calculated based on the first PMI at 411 and the last reported RI at 405. The same procedure can be applied to the reporting instance 413.

In the current embodiment, when the first PMI is not calculated based on the last reported RI, then the second PMI and CQI are calculated based on the first PMI, which is predefined in a cyclic method among the candidate first PMI set of corresponding last reported RI.

For example, for this case, a certain first PMI set in Rank 2 may be defined. It is assumed that this set includes first PMIs from index 0 to 3 in the Table 6.3.4.2.3-4 in the 3GPP TS 36.211 v10.3.0. The first PMI is assumed in a cyclic way. Herein, the cyclic way indicates cyclically using in an orderly manner predefined first PMIs among a plurality of first PMIs in the candidate first PMI set. At the reporting instance 407, the second PMI and CQI can be calculated based on the first PMI with an index of 0. At the reporting instance 409, the second PMI and CQI can be calculated based on the first PMI of 1. At the reporting instance 413, the second PMI and CQI can be calculated conditioned on the first PMI with an index of 2.

Figure 5:
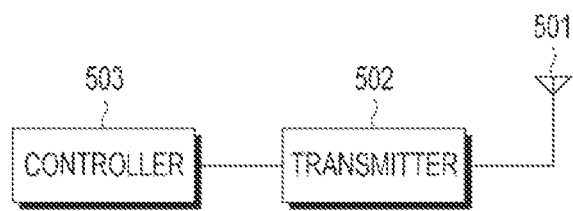
FIG. 5 is a block diagram illustrating a UE according to an embodiment of the present invention.

FIG. 5 is a block diagram illustrating a UE according to an embodiment of the present invention.

Referring to FIG. 5, the UE that reports the CSI to the network and calculates the second PMI and CQI under a predetermined condition includes an antenna 501, a transmitter 502 for reporting the CSI to the network and a controller 503 for controlling operations of calculating the second PMI and CQI under the predetermined condition and reporting the CSI.

While the present invention has been particularly shown and described with reference to certain embodiments thereof, it will be understood by those of ordinary skill in the art that various changes or modifications may be made therein without departing from the spirit and scope of the present invention as defined by the following claims and any equivalents thereof.

What is claimed is:

1. A method for reporting Channel State Information (CSI) in an uplink by a User Equipment (UE) in a wireless communication system, the method comprising:
reporting a first Precoding Matrix Indicator (PMI) to an evolved Node B (eNB);
detecting that a Rank Indicator (RI) is changed before a second PMI is reported, the RI being changed within an RI group;
calculating the second PMI and a Channel Quality Indicator (CQI) using the first PMI; and
reporting the second PMI and the CQI to the eNB.

2. The method of claim 1, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

3. The method of claim 1, wherein the RI group includes a plurality of groups divided according to ranks.

4. A method for reporting Channel State Information (CSI) in an uplink by a User Equipment (UE) in a wireless communication system, the method comprising:
reporting a first Precoding Matrix Indicator (PMI) to an evolved Node B (eNB);
detecting that a Rank Indicator (RI) is changed before a second PMI is reported;
calculating the second PMI and a Channel Quality Indicator (CQI) based on a previous RI, which is reported before the RI is changed; and
reporting the second PMI and the CQI to the eNB.

5. The method of claim 4, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

6. A method for reporting Channel State Information (CSI) in an uplink by a User Equipment (UE) in a wireless communication system, the method comprising:
reporting a first Precoding Matrix Indicator (PMI) to an evolved Node B (eNB);
detecting that a Rank Indicator (RI) is changed before a second PMI is reported;
calculating the second PMI and a Channel Quality Indicator (CQI) using a first PMI which is predefined among a candidate first PMI set of a previous RI, which was reported before the RI is changed; and
reporting the second PMI and the CQI to the eNB.

7. The method of claim 6, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

8. A method for reporting Channel State Information (CSI) in an uplink by a User Equipment (UE) in a wireless communication system, the method comprising:
reporting a first Precoding Matrix Indicator (PMI) to an evolved Node B (eNB);
detecting that a Rank Indicator (RI) is changed before a second PMI is reported; and
not reporting the second PMI before the first PMI based on the changed RI is reported to the eNB.

9. The method of claim 8, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

10. A User Equipment (UE) for reporting Channel State Information (CSI) in an uplink in a wireless communication system, the UE comprising:
a transmitter configured to transmit, to an evolved Node B (eNB), the CSI including at least one of a first Precoding Matrix Indicator (PMI), and second PMI and Channel Quality Indicator (CQI); and
a controller configured to report, to the eNB, the second PMI and CQI, which are calculated using the first PMI, if the RI is changed before the second PMI is reported, after the first PMI is reported,
wherein the RI is changed within an RI group.

11. The UE of claim 10, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

12. The UE of claim 10, wherein the RI group comprises a plurality of groups divided according to ranks.

13. A User Equipment (UE) for reporting Channel State Information (CSI) in an uplink in a wireless communication system, the UE comprising:
- a transmitter configured to transmit, to an evolved Node B (eNB), the CSI including at least one of a first Precoding Matrix Indicator (PMI), and a second PMI and a Channel Quality Indicator (CQI); and
- a controller configured to report, to the eNB, the second PMI and the CQI, which are calculated based on a previous Rank Indicator (RI), which is reported before an RI changes, if the RI is changed before the second PMI is reported, after the first PMI is reported.

14. The UE of claim 13, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

15. A User Equipment (UE) for reporting Channel State Information (CSI) in an uplink in a wireless communication system, the UE comprising:
- a transmitter configured to transmit, to an evolved Node B (eNB), the CSI including at least one of a first Precoding Matrix Indicator (PMI), and a second PMI and a Channel Quality Indicator (CQI); and
- a controller configured to report, to the eNB, the second PMI and the CQI, which are calculated using a first PMI, which is cyclically predefined among a candidate first PMI set of a previous Rank Indicator (RI), which is reported before the RI changes, if the RI changes before the second PMI is reported, after the first PMI is reported.

16. The UE of claim 13, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

17. A User Equipment (UE) for reporting Channel State Information (CSI) in an uplink in a wireless communication system, the UE comprising:
- a transmitter configured to transmit, to an evolved Node B (eNB) the CSI including at least one of a first Precoding Matrix Indicator (PMI), and a second PMI and a Channel Quality Indicator (CQI); and
- a controller configured not to report, the second PMI before the first PMI based on a changed RI is reported, if the RI is changed before the second PMI is reported, after the first PMI is reported.

18. The UE of claim 17, wherein the first PMI indicates a wideband and long term channel condition, and the second PMI indicates a precoding matrix indicator in the wideband channel and long-term channel condition according to a Precoding Type Indicator (PTI) value and an instance at which the CSI is reported, or a precoding matrix indicator in the subband and short-term channel condition.

* * * * *